No. 742,414. PATENTED OCT. 27, 1903.
H. S. HALE.
MACHINE FOR SUPPLYING FOOD TO FISH OR LAND ANIMALS.
APPLICATION FILED FEB. 28, 1903.
NO MODEL.
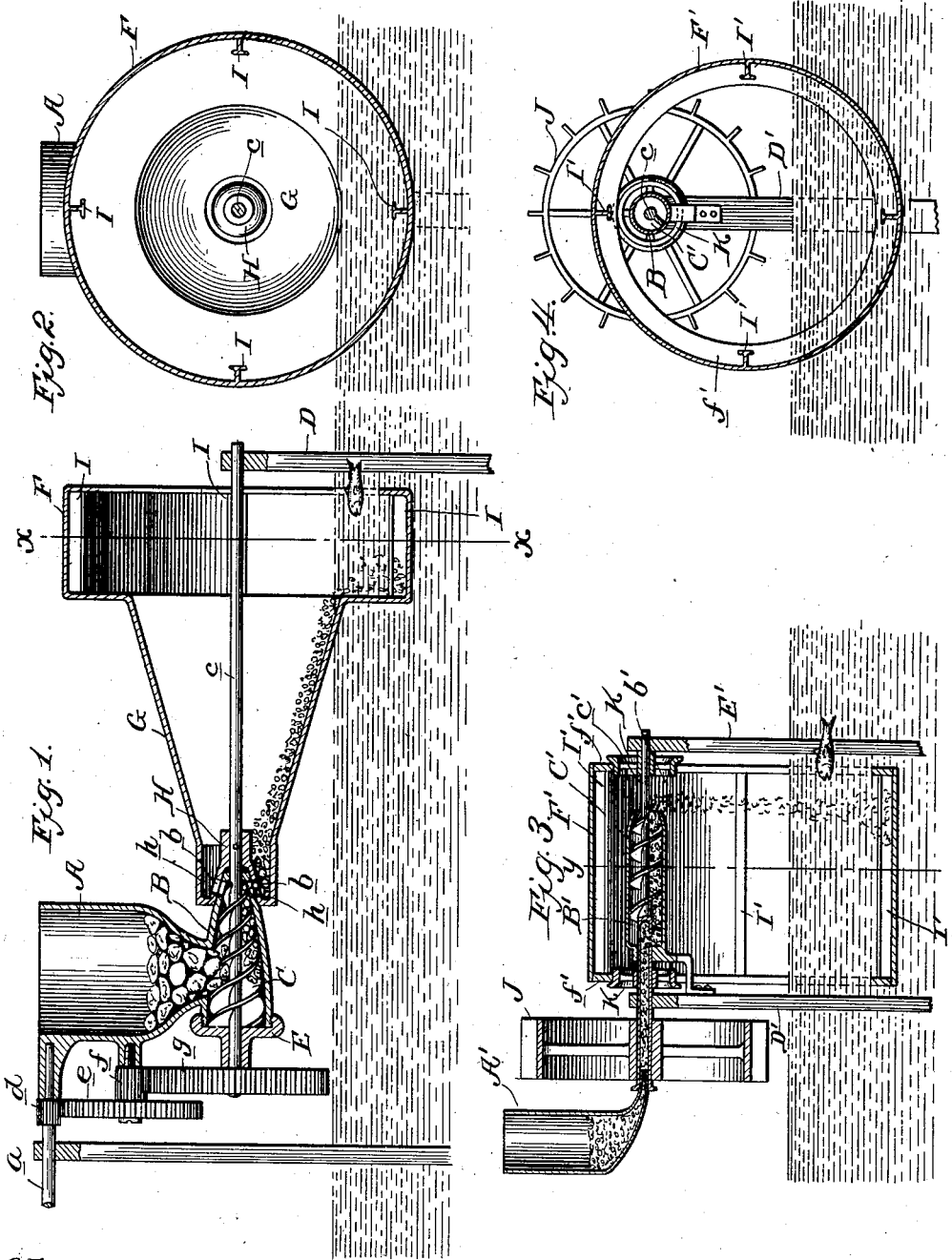
Witnesses
Inventor
Henry S. Hale No. 742,414. Patented October 27, 1903.

UNITED STATES PATENT OFFICE.

HENRY S. HALE, OF PHILADELPHIA, PENNSYLVANIA.

MACHINE FOR SUPPLYING FOOD TO FISH OR LAND-ANIMALS.

SPECIFICATION forming part of Letters Patent No. 742,414, dated October 27, 1903.

Application filed February 28, 1903. Serial No. 145,461. (No model.)

*To all whom it may concern:*

Be it known that I, HENRY S. HALE, of the city and county of Philadelphia, State of Pennsylvania, have invented Improvements in Apparatus for Supplying Food to Fish or Land-Animals, of which the following is a specification.

My invention relates to apparatus for supplying food to fish and land-animals, and is fully set forth in the following specification and shown in the accompanying drawings.

In feeding fish, poultry, &c., it is especially desirable that a uniform quantity of food should be supplied in a given period of time. In large fish and poultry hatcheries much time and labor are consumed in supplying the food, and a uniform supply cannot be obtained under present methods without constant care and attention on the part of the operatives. In pisciculture especially great care must be exercised, and the character as well as the quality of the food must be regulated to suit the size and species of the young fish.

It is one object of my invention to provide mechanical devices for supplying the food at the feeding beds or inclosures without requiring the constant attention of the attendants.

It is also an object of my invention to provide an apparatus which when supplied with a quantity of food of the proper quality will supply the same in predetermined and uniform quantities. Such apparatus may be operated by hand to supply a measured quantity of food at given intervals or may be driven by suitable power devices to maintain a predetermined supply of food in a given period of time without requiring any attention from the attendants except to see that the food-supply in the apparatus is not exhausted.

It is desirable, particularly in pisciculture, that the feed should not be permitted to fall and remain upon the bottom, and to prevent this I employ a rotary feed-receiver which receives the fallen feed and carries it up out of the water and drops it again therein. This receiver is rotated at a very slow speed and is open, so that the fish may enter freely therein and take the feed as it is falling through the water. The feed supplied may be of any suitable character, that used in pisciculture usually being mixed with water and flowing readily.

For purposes of illustration I have shown my invention as especially employed for fish-feeding; but I do not mean to limit myself to such use of my invention, as it is obvious that it may be employed for feeding poultry, &c., in which case, however, the rotary receiver for picking up and again dropping the feed would not ordinarily be used.

My invention is shown in the accompanying drawings, in which—

Figure 1 is a longitudinal vertical sectional view of a feeding apparatus embodying my invention. Fig. 2 is a transverse vertical sectional view of the same on the line $x\ x$ of Fig. 1. Fig. 3 is a longitudinal vertical sectional view of a modified form of feeding apparatus, and Fig. 4 is a transverse vertical view of the same on the line $y\ y$ of Fig. 3.

Referring first to the construction shown in Figs. 1 and 2, A is a receptacle or hopper containing a quantity of food and communicating with a chamber B, in which a rotary conveyer C is arranged. The conveyer receives the food from the hopper A and discharges it through an opening or openings $b$ in the chamber B. The conveyer C is carried on a suitable shaft $c$, which is operated by any suitable power devices. In the construction shown it is driven from a power-shaft $a$ through speed-reducing gears $d\ e\ f\ g$ and is journaled at one end in a standard D and at the other end in the head E of the chamber B.

In the construction shown in Figs. 1 and 2 the conveyer C acts as a disintegrator, cutter, or grinder to reduce the pieces of food to fine particles before they emerge from the outlet $b$.

The conveyer C moves slowly, and it is evident that in a given period of time it will convey and discharge a measured quantity of food.

It is desirable in fish-feeding that the food should not be allowed to fall to and remain upon the bottom, and I prefer when my food measuring and supplying apparatus is used for this purpose to employ an open receptacle or vessel more or less submerged in the water, into which the food may fall and by the movement of which such particles of food as may accumulate at the bottom of the receptacle may be raised and caused to fall again through the water. In the construction shown in Figs. 1 and 2 this receptacle consists of a drum F open at its outer end and connected with the shaft $e$ by a conical extension G, formed with a head or socket H fitting over the end of the chamber C and fastened to the shaft $c$. The head or socket H is provided with one or more apertures $h$, adapted to register with the aperture $b$ in the end of the chamber B, and the drum F rotates. The drum F is partly submerged in the water, and as the shaft $e$ rotates slowly the conveyer C carries the food forward and discharges it through the openings $b\ h$, whence it passes down the conical wall of the extension G and drops into the water within the drum F. The fish enter the open end of the drum to take the food. Such food as accumulates in the lower portion of the drum is lifted by the rotating drum and carried up out of the water and allowed to fall again, so that the food may be kept constantly falling through the water, under which condition it is more readily taken by the fish. To enable the slowly-rotating receptacle or drum to thus lift and carry the fallen food, its inner surface may be roughened or provided with ribs or flanges I. When the head or socket H is employed, the food can escape only when the apertures $h$ thereof are in register with the discharge-aperture $b$ of the chamber B, and thus the quantity of food will be measured and may be nicely controlled by the size of the apertures and the speed of rotation of the shaft $e$.

In the construction shown in Figs. 3 and 4 I have shown the conveyer C' carried by a shaft $c'$, mounted in standards D' E' and arranged within a stationary chamber B', open at its end, as at $b'$, for the discharge of the food which is supplied to the chamber B' from a hopper A' through a hollow end of the shaft $c'$. For purposes of illustration I have shown the shaft $c'$ in this case operated by a water-wheel J. As the food is carried forward by the conveyer C' it will fall from the open end $b'$ of the chamber B'. In this construction also I have shown a rotary receptacle for use in fish-feeding for the purpose of lifting the fallen food and allowing it to drop again into the water. The receptacle in this case consists of a drum F', open at both ends and provided internally with the lifting flanges or ribs I'. For the purpose of imparting a relatively slow rotary movement to the drum F' it is supported by its annular inturned flanges or ribs $f'$ upon flanged wheels K, carried by the shaft $c'$, which as the shaft $c'$ rotates will impart a relatively slow rotary movement to the drum F about the discharge end of the conveyer C'.

While the use of a traveling receptacle for lifting up the fallen food and dropping it again into the water is desirable for fish-feeding, it may, if desired, be omitted, and for feeding poultry and other land animals it will not be required.

The details of construction shown may be varied without departing from the invention.

What I claim as new, and desire to secure by Letters Patent, is as follows:

1. In apparatus for supplying feed, the combination of a holder to contain a quantity of the feed, means for receiving, conveying and discharging the feed therefrom in measured quantities, a receiving vessel open to permit the entrance of the fish or animals to be fed and arranged to receive the discharged feed, and means to impart a rotary movement to said vessel.

2. In apparatus for supplying feed, the combination of a holder to contain a quantity of the feed, means for receiving, conveying and discharging the feed therefrom in measured quantities, a receiving vessel open to permit the entrance of the fish or animals to be fed and arranged to receive the discharged feed and provided internally with ribs or flanges, and means to impart a rotary movement to said vessel.

3. In apparatus for supplying feed to fish, &c., the combination of feed-discharging devices and feed-receiving devices having a rotary movement relative to said feed-discharging devices.

4. In apparatus for supplying feed to fish, &c., the combination of a partially-submerged rotary receiver, and means for supplying the feed thereto.

5. In apparatus for supplying feed to fish, &c., the combination of a partially-submerged receiver, means for rotating said receiver on a horizontal axis, and means for supplying feed to said receiver.

6. In apparatus for supplying feed to fish, &c., the combination of a rotary shaft, means for supplying feed, controlled by said shaft, a rotary feed-receiver, and connections between said shaft and feed-receiver to impart a slow rotary movement thereto.

7. In apparatus for supplying feed to fish, &c., the combination of a rotary shaft, wheels carried thereby, a hollow drum supported by said wheels and rotated thereby, and means for supplying feed within said drum.

8. In apparatus for supplying feed to fish, &c., the combination of a hollow rotary drum provided internally with projections or flanges, and means to supply feed to the interior of said drum.

In testimony of which invention I have hereunto set my hand.

HENRY S. HALE.

Witnesses:
ERNEST HOWARD HUNTER,
R. M. KELLY.